(12) United States Patent
Muto

(10) Patent No.: US 6,774,947 B2
(45) Date of Patent: Aug. 10, 2004

(54) IMAGE PICKUP APPARATUS

(75) Inventor: Kazuyoshi Muto, Handa (JP)

(73) Assignee: Mutsumi Corporation Ltd., Handa (JP)

( * ) Notice: Subject to any disclaimer, the term of this patent is extended or adjusted under 35 U.S.C. 154(b) by 767 days.

(21) Appl. No.: 09/794,600

(22) Filed: Feb. 27, 2001

(65) Prior Publication Data

US 2001/0017654 A1 Aug. 30, 2001

(30) Foreign Application Priority Data

Feb. 29, 2000 (JP) ........................................ 2000-053594

(51) Int. Cl.[7] .............................................. H04N 5/225
(52) U.S. Cl. ........................ 348/373; 348/65; 348/359
(58) Field of Search ............................ 348/207.99, 373, 348/374, 375, 79, 65, 359

(56) References Cited

U.S. PATENT DOCUMENTS 4,600,939 A * 7/1986 Sluyter et al. ................ 348/73

FOREIGN PATENT DOCUMENTS

| JP | 63-011840 | 1/1988 | .......... G01N/21/35 |
| JP | 09-139821 | 5/1997 | ............ H04N/1/19 |
| WO | 97/05473 | 2/1997 | .......... G01N/21/47 |

* cited by examiner

Primary Examiner—Aung Moe
(74) Attorney, Agent, or Firm—Davis & Bujold, P.L.L.C.

(57) ABSTRACT

An image pickup apparatus has a lens, an optical fiber and a scanning stage. The tip end of an optical fiber is disposed on a surface for forming a subject image by the lens via the scanning stage. The scanning stage can rotate horizontal and vertical scanning motors to move the tip end of the optical fiber along the subject image forming surface in horizontal and vertical directions. Moreover, during photographing of a subject, an image processor drives and controls the motors via a stage controller to successively move the tip end of the optical fiber in the horizontal and vertical directions. During movement, a detection signal from a photodetector disposed on the terminal end of the optical fiber is successively extracted, and a signal level is written into a memory together with information indicating the tip end position of the optical fiber.

4 Claims, 5 Drawing Sheets

DETECTION SIGNAL
(TO IMAGE PROCESSOR)

IMAGE PICKUP APPARATUS

BACKGROUND OF THE INVENTION (i) Field of the Invention

The present invention relates to an image pickup apparatus for picking up a subject image, particularly to an image pickup apparatus suitable for optically analyzing a test object.

(ii) Description of the Related Art

In a conventional art, an image pickup apparatus for picking up the two-dimensional image of a test object has heretofore been used, for example, in astronomical observation, analysis of materials constituting an object, analysis of a wavelength of a laser beam emitted from a semiconductor laser, observation of the combustion state of a fuel in the cylinder of an internal combustion engine, analysis of plasma, and other optical analyses of the states of various test objects.

However, as such image pickup apparatus, there has been only a general camera in which a photosensitive film is disposed in an image forming position (surface) by a lens for forming a subject image and the two-dimensional image of a test object is formed on the film, or a so-called digital camera in which an image sensor consisting of CCD or the like is disposed on the image forming surface of the lens and an electric signal obtained for each pixel constituting the image sensor is processed to generate the image data of a subject. Therefore, there is a problem that the image pickup apparatus suitable for optically analyzing the test object has not existed.

That is to say, in order to optically analyze various test objects as described above, it is necessary to photograph the test object with an invisible ultraviolet ray, an infrared ray or another specific-wavelength light. However, when this is realized by the conventional image pickup apparatus, it is necessary to prepare several types of filters which transmit only the light components having specific wavelengths, select a desired filter from the filters, and dispose the filter in front of the lens during photographing of the test object.

Therefore, in the conventional art, when the test object is photographed and optically analyzed, the filter attached to the image pickup apparatus has to be frequently changed, and much trouble is disadvantageously required for a photographing operation.

Moreover, when the image sensor consisting of CCD or the like is used to photograph the test object, the obtained image data can be processed using information processors such as a computer. An analyzing operation can efficiently be performed as compared with when the general camera is utilized. In the conventional image sensor, however, the dynamic range of the sensitivity of an image pickup elements such as CCD constituting each pixel of the image sensor is small, and further the sensitivity cannot be adjusted for each pixel (i.e., for each image pickup element).

Therefore, when the digital camera consisting of the image sensor is used as the image pickup apparatus for photographing the test object, the sensitivity of the entire image sensor needs to be adjusted in order to prevent the brightest portion of the image from causing a halation. However, with such sensitivity adjustment, when the subject image having a large brightness/darkness difference is photographed, the obtained image becomes so dark that the analysis operation of the test object is sometimes hindered.

SUMMARY OF THE INVENTION

An object of the present invention is to provide an image pickup apparatus which can easily obtain a high-precision two-dimensional image necessary for optically analyzing a subject as a test object.

To attain this and other objects, according to a first aspect of the present invention, there is provided an image pickup apparatus which includes a lens for forming a subject image in a predetermined position and in which the tip end surface of an optical fiber is disposed on a surface for forming the subject image by the lens via a support member. As a result, a light constituting the specific portion of the subject image formed by the lens is incident upon the optical fiber.

Moreover, the support member can be moved along the surface on which the subject image is to be formed via a driver driven and controlled in a predetermined scanning pattern by a scanner. When the driver is driven/controlled in this manner, the position of the support member, and the incident position of the light upon the optical fiber supported by the support member are gradually changed on the subject image forming surface.

On the other hand, a photodetector for converting the light transmitted via the tip end of the optical fiber into an electric signal is disposed on the terminal end of the optical fiber. The electric signal is inputted into an image data generator from the photodetector. Subsequently, the image data generator successively takes the electric signal from the photodetector in synchronization with the change of the light incident position upon the optical fiber on the subject image forming surface by the operation of the scanner. The signal level of the electric signal is associated with the incident position of the light upon the optical fiber, and stored in a storage medium.

Therefore, when the scanner moves and scans the light incident position upon the optical fiber along the subject image forming surface, the pixel data corresponding to the light brightness of each portion of the subject image formed by the lens is successively stored into the storage medium. Finally, the pixel data for one frame of the subject image is stored as the image data in the storage medium.

Therefore, when the image data stored in the storage medium is used to display the subject image on a display formed of CRT, liquid crystal display or the like, or when the image data is outputted to various printers such as an ink jet printer and a laser printer, and the subject image is printed on a desired sheet, a user can confirm the subject image from the displayed image or the printed image. Moreover, when information processors such as a computer are used to process the image data, a subject, that is, a test object can remarkably easily be analyzed optically.

Furthermore, in the present invention, when the subject image data is generated as described above, the tip end of the optical fiber is moved along the subject image forming surface, the light signal transmitted via the optical fiber is converted to digital data in each position of the moving optical fiber tip end, and the pixel data for one pixel constituting the image data is obtained. Therefore, as compared with the conventional image pickup apparatus for using the image sensor of CCD or the like to generate the image data, high-precision image data can remarkably easily be obtained.

That is to say, according to the image pickup apparatus of the present invention, while the tip end of the optical fiber is moved and scanned along the subject image forming surface, the photodetector is used to successively generate the pixel data constituting the subject image data on the terminal end of the optical fiber. Therefore, the resolution of the obtained image data corresponds to one control amount, that is, the change amount of the position of the light incident upon the optical fiber during driving/controlling of the driver by the scanner.

Therefore, when the scanner is adjusted so as to reduce this displacement amount, the resolution of the obtained image data can be enhanced. Conversely, when the scanner is adjusted so as to increase the displacement amount, the resolution of the obtained image data can be lowered. That is to say, the image pickup elements of CCD or the like is disposed on a plane in the image sensor for use in the conventional digital image pickup apparatus with which the image data can directly be inputted to the computer. Therefore, the resolution of the obtained image data is limited by the number of image pickup elements and an interval between the image pickup elements. According to the image pickup apparatus of the present invention, however, the resolution of the obtained image data can arbitrarily be adjusted.

Therefore, according to the image pickup apparatus of the present invention, it is possible to photograph even a fine test object, such as the section of the laser beam emitted from the semiconductor laser, which has been difficult to photograph with the conventional image sensor. Therefore, the application range of the image pickup apparatus can be enlarged.

Additionally, in order to enhance the resolution of the obtained image data in this manner, the driver needs to move the support member with a higher precision. For this purpose, according to a second aspect of the present invention, the driver is constituted of a pair of step motors for moving the support member in two axial directions which cross at right angles to each other. The position of the light incident upon the optical fiber may be changed by driving the respective step motors in a predetermined scanning pattern by the scanner.

That is to say, when the pair of step motors are used to move the support member in two axial directions (e.g., horizontal and vertical directions), the moving amount of the support member in each direction can be controlled in accordance with the number of driving steps of the step motor with a high precision. Therefore, according to a second aspect of the image pickup apparatus, the high-precision and high-resolution image data can easily be obtained.

Moreover, as described above, for the conventional image sensor, the dynamic range of the sensitivity of the image pickup elements constituting the image sensor is small, and the sensitivity needs to be adjusted in the entire image sensor. Therefore, when the subject with only the specific portion thereof being bright is photographed, the entire image becomes dark. In the image pickup apparatus of the present invention, however, since all the pixels constituting the image are extracted by one photodetector, the dynamic range of the sensitivity can arbitrarily be set. For example, when using a photoelectrically converting device having a large dynamic sensitivity range (e.g., a photomultiplier) as the detector, the image data in which the subject image is faithfully reproduced can be obtained.

Furthermore, in the image pickup apparatus of the present invention, since the image data is prepared by changing the position of the light incident upon the optical fiber and successively extracting the electric signal from the photodetector, a photographing time per one frame of the image is lengthened. However, by using the photodetector of which sensitivity is adjustable, the sensitivity of the photodetector can be adjusted in accordance with the level of the electric signal extracted from the photodetector during the preparation of the image data. In this case, even when the dynamic range of the sensitivity of the photodetector is relatively small, a clear image can be obtained by adjusting the level of the detection signal extracted by the image data generator to be optimum.

On the other hand, as described above, in order to optically analyze various test objects, it is necessary to photograph the test object with a specific-wavelength light including an ultraviolet or infrared ray. However, according to the image pickup apparatus of the present invention, when the test object is analyzed, it is unnecessary to perform the conventional operation for preparing several types of filters in advance, selecting the filter from the filters and disposing the selected filter before the lens. Additionally, the analyzing operation can also be performed remarkably easily.

That is to say, according to a third aspect of the present invention, in order to photograph a subject with the light having a desired wavelength by the image pickup apparatus of the present invention, there is provided a spectral unit for splitting the light transmitted via the optical fiber and passing only the light with a specific wavelength. The specific-wavelength light split by the spectral unit is inputted to the photodetector. Alternatively, according to a fourth aspect of the present invention, there is provided a distributor for distributing the light transmitted via the optical fiber into a plurality of paths, and a plurality of photodetectors capable of detecting the lights different in wavelength from one another are disposed on the respective paths of the lights distributed by the distributor.

According to the third aspect of the image pickup apparatus, the image data of the subject photographed with the desired light can be obtained. Additionally, when the spectral unit simply changes the wavelength of the light to be passed through the photodetector, a plurality of types of image data of the subject photographed with different wavelength lights can easily be obtained. Moreover, according to the fourth aspect of the image pickup apparatus, similarly as the third aspect, a plurality of types of image data of the subject photographed with the different wavelength lights can easily be obtained. Therefore, the image pickup apparatus of the present invention is remarkably suitable for optically analyzing the test object.

BRIEF DESCRIPTION OF THE DRAWINGS

A preferred embodiment of the present invention will be described hereinafter with reference to the drawings.

DETAILED DESCRIPTION OF PREFERRED EMBODIMENTS

Figure 1:
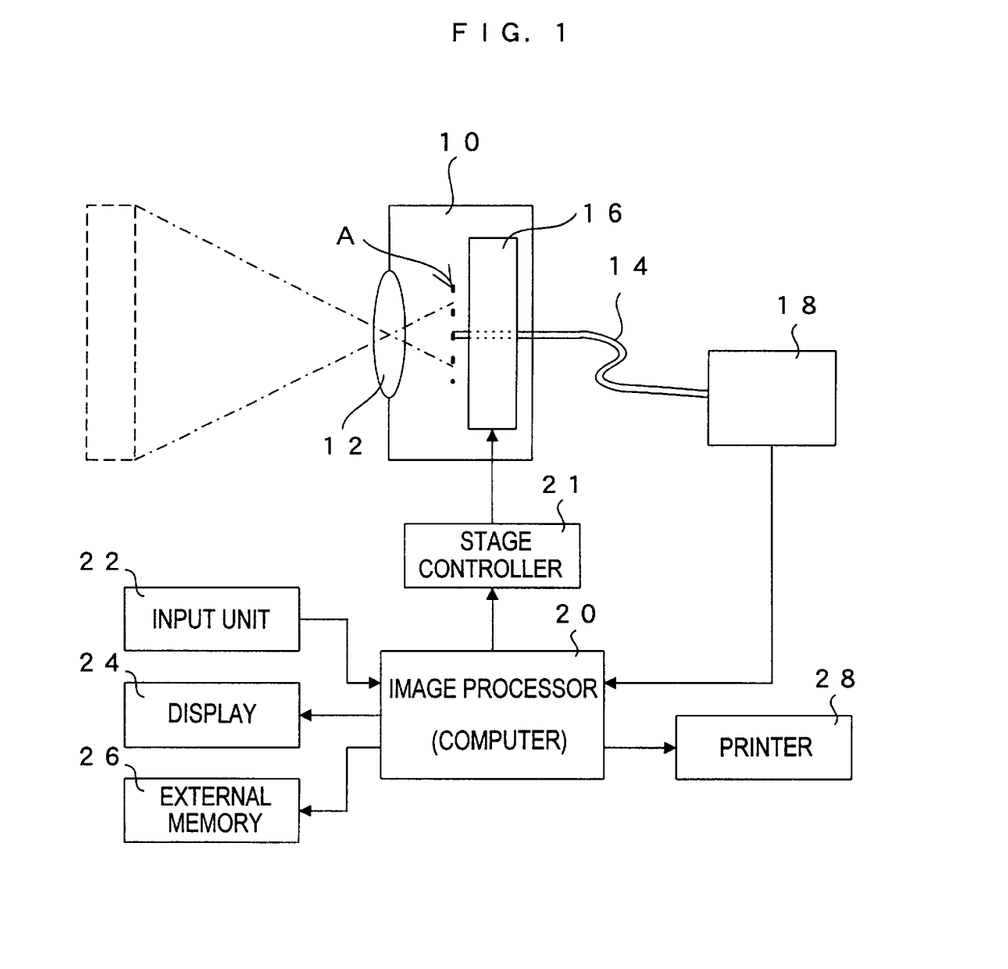
FIG. 1 is a block diagram showing the entire constitution of an image pickup apparatus according to an embodiment.

FIG. 1 is a block diagram schematically showing the entire constitution of an image pickup apparatus according to the embodiment of the present invention.

As shown in FIG. 1, the image pickup apparatus of the present embodiment is an apparatus for optically analyzing various types of test objects. The apparatus is provided with a fiber camera 10 for photographing an image of a subject as the test object. The fiber camera 10 is constituted of a lens 12 for forming the subject image in a predetermined position inside the camera, and a scanning stage 16 for disposing the tip end of an optical fiber 14 on a surface A on which the subject image is to be formed by the lens 12 and for vertically and horizontally moving or scanning the tip end of the optical fiber 14 on the image forming surface A. Moreover, disposed on the terminal end of the optical fiber 14 drawn to the outside from the scanning stage 16 is a photodetector 18 formed of a photoelectrically converting device for converting the light transmitted via the optical fiber 14 into an electric signal. A detection signal from the photodetector 18 is inputted to an image processor 20 of a computer mainly provided with CPU, ROM and RAM.

Figure 2A:
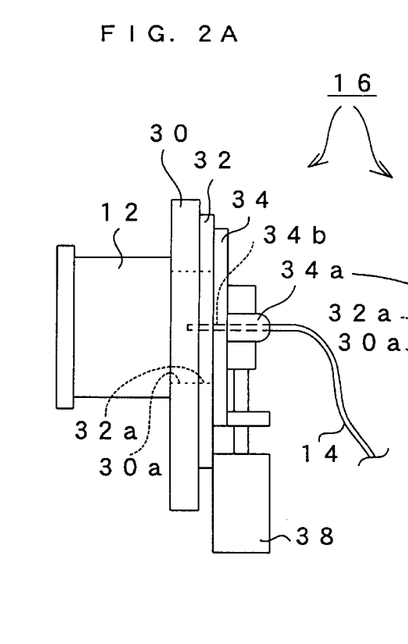
FIGS. 2A and 2B are explanatory views schematically showing the constitution of a scanning stage.
Figure 2B:
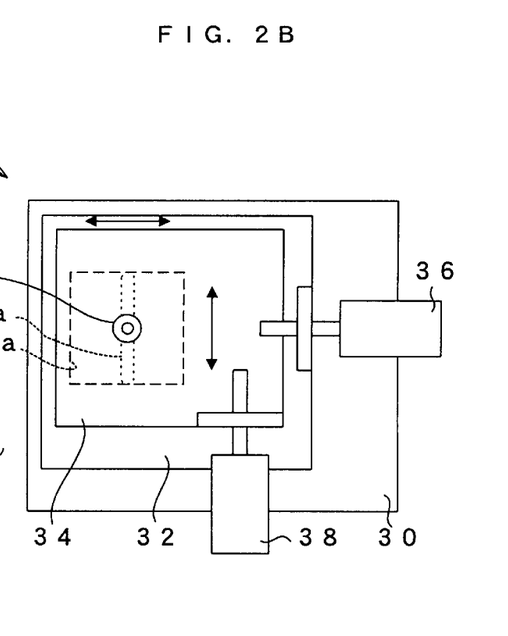

Here, as shown in FIG. 2A, the scanning stage 16 is provided with: a plate stage main body 30 to one surface of which the lens 12 is attached and in which an opening 30$a$ for extracting the subject image formed by the lens 12 is formed; a flat horizontal scanning plate 32 which is attached on the surface of the stage main body 30 opposite to the lens 12 and which can move only in a horizontal direction; and a flat vertical scanning plate 34 which is attached on the surface of the horizontal scanning plate 32 opposite to the stage main body 30 and which can move in a vertical direction crossing at right angles to the moving direction of the horizontal scanning plate 32. Moreover, the horizontal scanning plate 32 is moved in the horizontal direction by the rotation of a horizontal scanning motor 36 disposed on the stage main body 30, and the vertical scanning plate 34 is moved in the vertical direction by the rotation of a vertical scanning motor 38 disposed on the horizontal scanning plate 32. Moreover, the optical fiber 14 is fixed to the vertical scanning plate 34 via a fixing member 34$a$. The tip end of the optical fiber 14 is passed through holes 34$b$ and 32$a$ formed in the vertical and horizontal scanning plates 34 and 32 to project in the opening 30$a$ of the stage main body 30 which corresponds to the position of the subject image formed by the lens 12.

Additionally, the through hole 34$b$ formed in the vertical scanning plate 34 is a circular hole having substantially the same diameter as that of the optical fiber 14 and capable of passing the optical fiber 14, so that the tip end of the optical fiber 14 fixed via the fixing member 34$a$ projects toward the lens 12. The through hole 32$a$ formed in the horizontal scanning plate 32 is a hole elongated in the vertical direction. Therefore, the tip end of the optical fiber 14 can also move in the vertical direction as the vertical scanning plate 34 moves in the vertical direction. Moreover, the horizontal and vertical scanning motors 36 and 38 constitute a driver of the present invention. In the present embodiment, these motors are step motors, such that the tip end position of the optical fiber 14 can be controlled with a high precision.

Moreover, in the scanning stage 16 constituted as described above, when the horizontal scanning motor 36 is rotated, the tip end of the optical fiber 14 fixed to the vertical scanning plate 34 as the support member of the present invention can be moved or scanned in the horizontal direction. When the vertical scanning motor 38 is rotated, the tip end of the optical fiber 14 can be moved or scanned in the vertical direction. Therefore, the image pickup apparatus of the present embodiment is provided with a stage controller 21 for driving the respective scanning motors 36, 38 to move the tip end position of the optical fiber 14 in the horizontal and vertical directions on the surface on which the subject image is formed by the lens 12.

Furthermore, since the image processor 20 drives and controls the respective scanning motors 36, 38 via the stage controller 21, the tip end position of the optical fiber 14 is changed in the horizontal and vertical directions. In other words, the position of the light incident upon the optical fiber 14 is changed in the horizontal and vertical directions on the surface for forming the subject image by the lens 12. In synchronization with the change, the detection signal is extracted from the photodetector 18, and thereby the image data indicating the subject image is generated.

An image pickup process to be executed in the image processor 20 in order to pick up the subject image in this manner will be described hereinafter with reference to a flowchart of FIG. 3.

In addition to the photodetector 18 and stage controller 21, the image processor 20 is connected to: an input unit (keyboard, mouse, and the like) 22 for inputting various instructions for processing the generated image data of the photographed subject image to the image processor 20 by an external operation; a display (CRT, liquid crystal display, or the like) 24 for displaying the photographed subject image, and images for guiding the operations of the apparatus; an external memory (hard disk, optical disk, magnetic optical disk, or the like) 26 for storing the subject image data; and a printer 28 for printing the photographed subject image.

Figure 3:
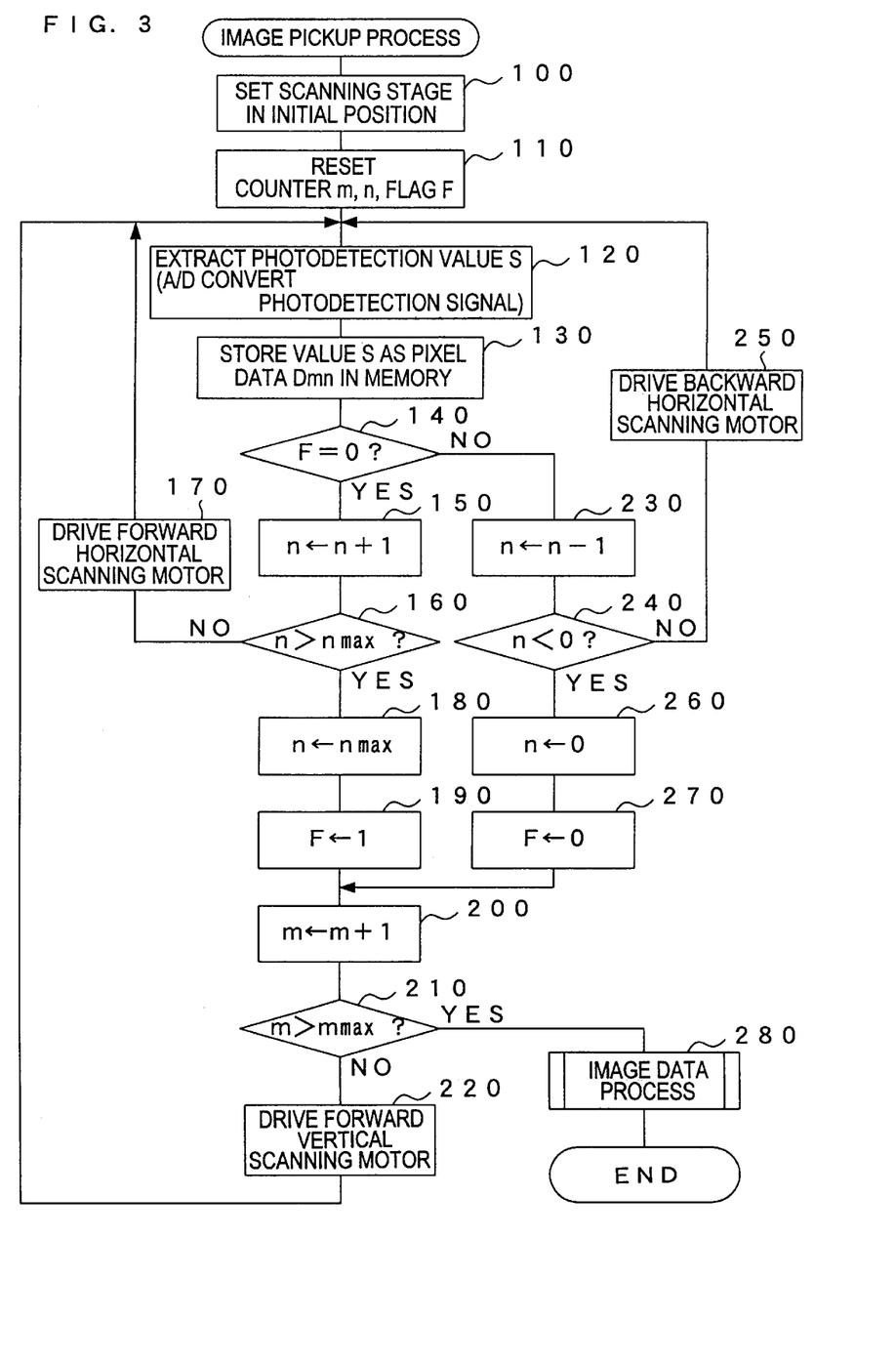
FIG. 3 is a flowchart showing an image pickup processing executed in an image processor.

The image pickup process shown in FIG. 3 is executed in the image processor 20 when the user inputs an instruction for picking up the subject image to the image processor 20 via the input unit 22. When this process starts, in step 100 the scanning stage 16 is set in an initial position by the rotation of the respective scanning motors 36 and 38 via the stage controller 21. The initial position indicates the position of the scanning stage 16 for disposing the tip end of the optical fiber 14 in a standard position on the left upper end of the subject image formed by the lens 12.

After the scanning stage 16 is set in the initial position in the step 100, an initializing process is executed in the subsequent step 110 to reset counters m, n and flag F for use in the subsequent process to value "0". In the subsequent step 120, the detection signal from the photodetector 18 is A/D converted, so that a detection signal level is extracted as a photodetection value S. Furthermore, in the subsequent step 130, the extracted photodetection value S is stored as one piece of pixel data Dmn indicating the subject image into an image data storage area of a memory RAM as a storage medium. Characters m, n affixed to the pixel data indicate the values of the counters m, n. In the step 120, the presently extracted photodetection value S is stored into the memory as pixel data D in the position of m-th row and n-th column when the subject image is split into rows and columns (a standard position of 0 row and 0 column at the present moment).

Subsequently, after the pixel data Dmn is stored into the memory in the step 130, it is determined in the step 140 whether or not the flag F is reset, that is, whether or not the value is "0". If the flag F is reset, in the subsequent step 150, the value of the counter n is incremented by one (+1). It is determined in the subsequent step 160 whether or not the value of the counter n exceeds a maximum value nmax. Subsequently, when the value of the counter n does not exceed the maximum value nmax, that is, when the value is the maximum value nmax or less in the step 160, the process shifts to the step 170. In the step 170, the horizontal scanning motor 36 is driven and rotated by the predetermined number of steps in a forward direction via the stage controller 21. Thereby, the tip end position of the optical fiber 14 in the scanning stage 16 is moved toward the right by a predetermined amount, and the process shifts to the step 120 again.

That is to say, in the steps 150 to 170, the counter n indicating the column of the pixel data is counted up, the horizontal scanning motor 36 is successively rotated by the predetermined number of steps in the forward direction, and the tip end position of the optical fiber 14 is successively moved toward the right by the predetermined amount. For each movement, the pixel data Dmn is stored into the memory in the steps 120 and 130. Therefore, in the process, when the m-th row of the subject image is horizontally scanned, (nmax+1) pieces of pixel data D from 0-th column to nmax-th column are successively stored into the memory.

Subsequently, when it is determined in the step 160 that the value of the counter n exceeds the maximum value nmax, that is, when the extracting of the pixel data D with the horizontal scanning of the m-th row is finished, the value of the counter n is set to the maximum value nmax in step 180, the value of the flag F is set to "1" in the step 190, the value of the counter m is incremented by one (+1) in the step 200, and it is determined in the step 210 whether the value of the counter m exceeds the maximum value mmax.

Moreover, when it is determined in the step 210 that the value of the counter m does not exceed a maximum value mmax, in the step 220 the vertical scanning motor 38 is driven and rotated by the predetermined number of steps in the forward direction via the stage controller 21. Thereby, the tip end position of the optical fiber 14 in the scanning stage 16 is moved downward by the predetermined amount, and the process shifts to the step 120 again.

That is to say, when the m-th row is scanned horizontally toward the right and accordingly the extracting of the pixel data D is finished by a series of the steps 120 to 170, in the steps 180 to 220 the tip end position of the optical fiber 14 is moved by the predetermined amount in the vertical direction, and the tip end position of the optical fiber 14 is controlled in such a manner that the light of the next row can be extracted. Thereafter, in the steps 120 and 130, the photodetection value S of the right end (maximum column nmax) of the row is stored as the pixel data D into the memory. In the subsequent step 140, since the flag F is set, negative determination results (NO), and the process shifts to the step 230.

In the step 230, the value of the counter n is decreased by one (-1), and it is determined in the subsequent step 240 whether or not the value of the counter n is smaller than the initial value "0", that is, whether the value of the counter n becomes negative. Subsequently, when it is determined in the step 240 that the value of the counter n is "0" or more, the process shifts to the step 250. In the step 250, the horizontal scanning motor 36 is rotated by the predetermined number of steps in a backward direction, the tip end position of the optical fiber 14 in the scanning stage 16 is accordingly moved toward the left by the predetermined amount, and the process shifts to the step 120 again.

That is to say, in the steps 230 to 250, the counter n indicating the column of the pixel data is counted down, the horizontal scanning motor 36 is successively rotated by the predetermined number of steps in the backward direction, and the tip end position of the optical fiber 14 is successively moved toward the left by the predetermined amount. For each movement, the pixel data Dmn is stored into the memory in the steps 120 and 130. Therefore, in the process, when the odd-number row (m=1, 3, . . .) of the subject image is horizontally scanned, (nmax+1) pieces of pixel data D from nmax-th column to 0-th column are successively stored into the memory.

Subsequently, when it is determined in the step 240 that the value of the counter n is a negative value less than the initial value "0", that is, when the extracting of the pixel data D with the horizontal scanning of the odd-number row is finished, the value of the counter n is set to the initial value "0" in the step 260, the value of the flag F is set to "0" in the step 270, and the process of the steps 200, 210 is executed.

Moreover, when it is determined in the step 210 that the value of the counter m does not exceed the maximum value mmax, in the step 220 the tip end position of the optical fiber 14 is controlled in such a manner that the light of the next row can be extracted. Thereafter, the process shifts to the step 120 again, and a series of the steps 120 to 170 are repeatedly executed. Thereby, the tip end position of the optical fiber 14 is successively moved toward the right by the predetermined amount, the even-number row (m=2, 4, . . .) of the subject image is horizontally scanned, and the (nmax+1) pieces of pixel data D from the 0-th column to the nmax-th column are successively stored into the memory.

Conversely, when it is determined in the step 210 that the value of the counter m exceeds the maximum value mmax, the process shifts to the step 280 to execute an image data processing. Specifically, all the pieces of pixel data {D(00) to D(nmax, mmax)} stored in the memory by the aforementioned process are read as the image data, the subject image is displayed in the display 24, and further in accordance with the instruction from the user, the image data is stored in the external memory 26, or the subject image is printed onto a predetermined recording sheet via the printer 28.

As described above, in the present embodiment, when the image processor 20 repeatedly executes the steps 100 to 270, the same number of pieces of image data as the number of pixels of the subject image photographed by the image sensor formed of the image pickup elements in (mmax+1) rows and (nmax+1) columns are stored in the memory, and the subject image is displayed in the display 24 based on the image data. Then, the user can store the image data into the external memory 26, or print and keep the subject image on the recording sheet as occasion demands.

Therefore, according to the image pickup apparatus of the present embodiment, the subject, that is, the test object can optically be analyzed by observing the subject image displayed in the screen of the display 24 or printed on the recording sheet, or further using the computer to process the obtained image data.

Moreover, in the present invention, the tip end of the optical fiber is successively scanned along the image forming surface of the subject image in the horizontal and vertical directions, the detection signal outputted from the photodetector 18 is successively extracted, the pixel data D constituting the image data is successively stored into the memory, and the image data of the subject is prepared. Therefore, the high-precision image data necessary for optically analyzing the test object as the subject can easily be obtained.

That is to say, according to the image pickup apparatus of the present embodiment, the driving amount (driving step number) obtained by once driving the scanning motor (step motor) 36 or 38 to successively scan the tip end of the optical fiber in the horizontal or vertical direction is reduced, so that the resolution of the obtained image data can be enhanced. Additionally, the photoelectric converting device having a large dynamic range is used in the photodetector 18, and the image data can therefore be obtained in which the subject image is faithfully reproduced. Therefore, the high-precision image data necessary for optically analyzing the subject image can easily be obtained.

Moreover, in order to optically analyze the test object with lights having various wavelengths, the image pickup apparatus is preferably constituted such that the test object can be photographed with the light having an arbitrary wavelength. For this purpose, the wavelength of the light to be converted into the electric signal by the photodetector 18 may be adjusted.

Figure 4A:
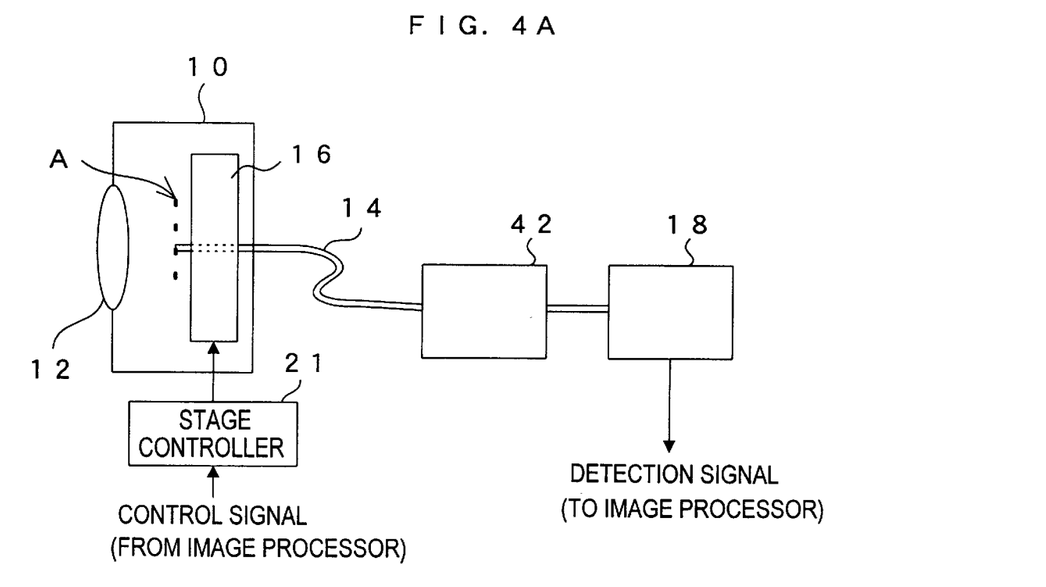
FIGS. 4A and 4B are explanatory views showing the modification of the image pickup apparatus of the present embodiment.

Furthermore, for this purpose, as shown in FIG. 4A, a spectral unit 42 formed of a prism or a diffraction lattice is disposed on the path of the optical fiber 14 extending to the photodetector 18 from the scanning stage 16, so that the light split by the spectral unit 42 and provided with the arbitrary wavelength is inputted to the photodetector 18.

Additionally, in the conventional art, when the test object is analyzed, Raman spectral method based on a light scattering phenomenon is sometimes utilized to check a transition (i.e., energy change acquired or lost by a molecule) between the molecular energy levels of a sample as the test object. When the test object is photographed in this Raman spectral method, a Raman spectral unit may be used in the spectral unit shown in FIG. 4A. That is to say, the image pickup apparatus constituted as described above is a Raman spectral camera. According to the present invention, even Raman spectral camera can easily be realized.

Figure 4B:
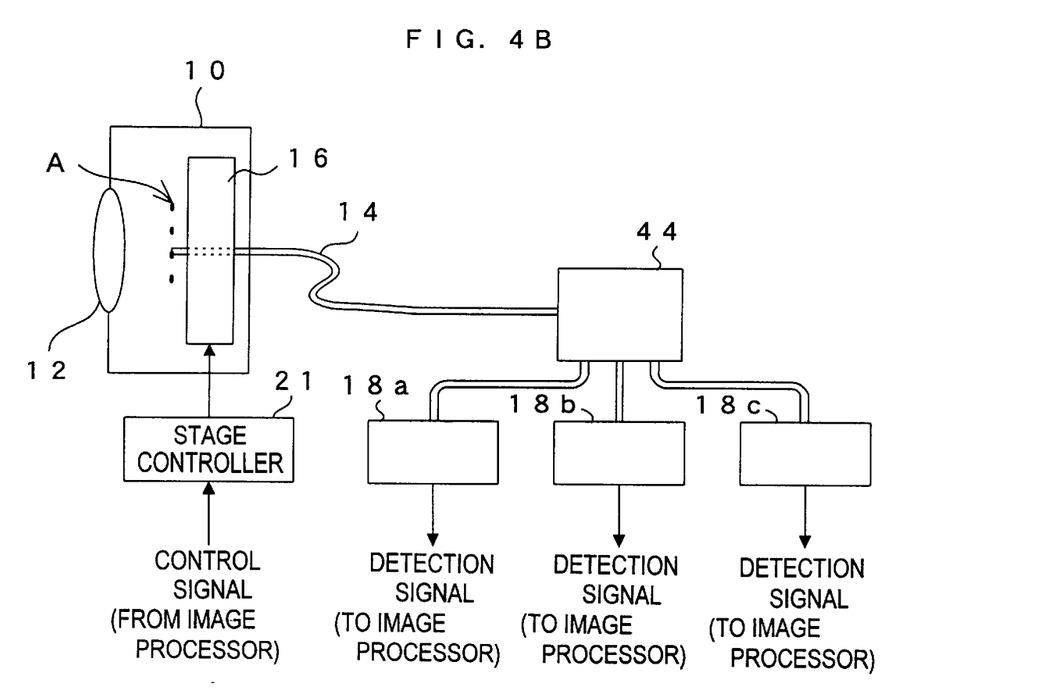

Moreover, for example, when three types of images (or a synthetic image of the images) are necessary: an image obtained by photographing the subject with a visible ray; an image obtained by photographing the subject with an infrared ray; and an image obtained by photographing the subject with an ultraviolet ray, as shown in FIG. 4B, a photo-distributor 44 for distributing the light transmitted via the optical fiber 14 into three systems is disposed. Furthermore, a photodetector 18a for detection with the visible ray, a photodetector 18b for detection with the infrared ray, and a photodetector 18c for detection with the ultraviolet ray are disposed on the light paths of three systems distributed by the photo-distributor 44. The detection signals from the respective photodetectors 18a, 18b and 18c may be inputted to the image processor 20.

Figure 5A:
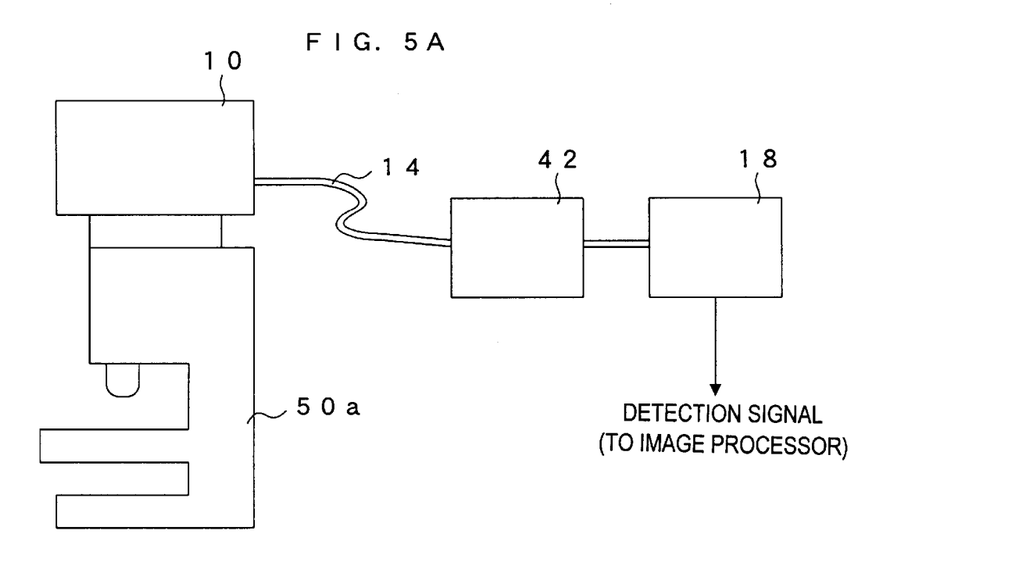
FIGS. 5A, 5B and 5C are explanatory views showing that the image pickup apparatus of the present embodiment and a microscope are utilized to analyze a sample.

On the other hand, for the image pickup apparatus of the present embodiment, for example, as shown in FIG. 5A, the fiber camera 10 is disposed in the ocular lens portion of a microscope 50a, and an output (light signal) from the fiber camera 10 is passed through the spectral unit 42 and inputted to the photodetector 18. Then, the microscope can be used to analyze a sample with a high precision.

Figure 5B:
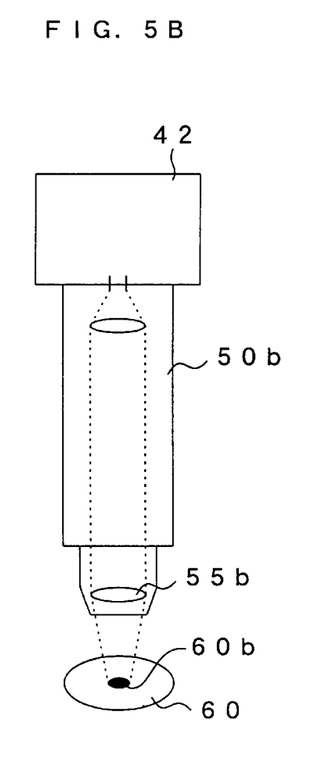

In the conventional art, for example, when light emission or absorption wavelength from the micro black point 60b of the sample 60 is measured, as shown in FIG. 5B, the sample 60 is set in the microscope 50b, and a microscopic spectral unit disposed in the ocular lens portion is used to analyze the light transmitted to the ocular lens portion from the objective lens 55b through an inner optical system. As shown in FIG. 5A, instead of this microscopic spectral unit, the fiber camera 10 is disposed in the ocular lens portion of the microscope 50a, and the output of the light signal from the fiber camera 10 may be inputted to the photodetector 18 through the spectral unit 42, so that the light emission or the absorption wavelength from the micro black point 60b of the sample 60 can be measured.

Figure 5C:
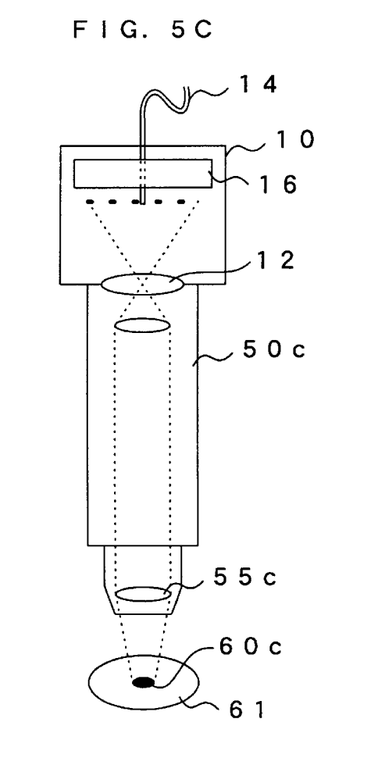

Moreover, particularly according to the image pickup apparatus of the present invention, as shown in FIG. 5C, the black point portion from the objective lens 55c is enlarged by the lens 12, and can be measured as the image of a group of micro spots 60c of the sample 61 by the scanning of the optical fiber 14. Therefore, the sample can be analyzed using the microscope 50c with a higher precision.

One embodiment of the present invention has been described above, but the present invention is not limited to the aforementioned embodiment, and can be implemented in various modes.

For example, in the aforementioned embodiment, the step motor is used in the scanning motors 36, 38 for moving and scanning the tip end position of the optical fiber 14. However, for example, a DC servo motor or other position controllable motors may also be used.

What is claimed is:

1. An image pickup apparatus comprising:
   a lens for forming a fore subject image in a back predetermined position;
   a support member for supporting a tip end of an optical fiber at the back of the lens, and disposing a tip end surface of the optical fiber on a surface for forming the subject image by said lens, so that a light constituting a part of the subject image is incident upon said optical fiber;
   driving means for moving the support member along the image forming surface of said subject image, and changing an incident position of the light upon said optical fiber on the image forming surface;
   photodetecting means, disposed on a terminal end of said optical fiber, for converting the light transmitted via the tip end of said optical fiber into an electric signal;
   scanning means for driving and controlling said driving means in a predetermined scanning pattern, and gradually changing the incident position of the light upon said optical fiber on the image forming surface of said subject image; and
   image data generating means for successively extracting the electric signal from said photodetecting means in synchronization with a change of the incident position of the light upon said optical fiber by an operation of the scanning means, associating a level of the electric signal with the incident position of the light upon said optical fiber, and storing the electric signal level and the light incident position to generate image data corresponding to said subject image.

2. An image pickup apparatus according to claim 1 wherein said driving means comprises a pair of step motors for moving said support member in two axial directions which cross at right angles to each other, and
   said scanning means drives the respective step motors in the predetermined scanning pattern, and changes the incident position of the light upon said optical fiber on said image forming surface.

3. An image pickup apparatus according to claim 1, further comprising spectral means for splitting the light transmitted via said optical fiber and passing the light having a specific wavelength, wherein said photodetecting means converts the light having the specific wavelength split by the spectral means into the electric signal.

4. An image pickup apparatus according to claim 1, further comprising:
   a plurality of photodetecting means capable of detecting respective lights different in wavelength from one another; and
   distributing means for distributing the light transmitted via said optical fiber into a plurality of paths,
   wherein said plurality of photodetecting means are disposed on the plurality of paths of the lights distributed by the distributing means.

* * * * *